United States Patent [19]

Walker et al.

[11] Patent Number: 5,168,353

[45] Date of Patent: Dec. 1, 1992

[54] VIDEO DISTRIBUTION SYSTEM ALLOWING VIEWER ACCESS TO TIME STAGGERED INDENTICAL PRERECORDED PROGRAMS

[75] Inventors: Stephen S. Walker, Marlborough, Mass.; Kathryn E. Ullrich, Los Angeles, Calif.

[73] Assignee: GTE Laboratories Incorporated, Waltham, Mass.

[21] Appl. No.: 633,593

[22] Filed: Dec. 21, 1990

[51] Int. Cl.⁵ .............................................. H04N 7/173
[52] U.S. Cl. ........................................ 358/86; 455/5.1
[58] Field of Search ..................... 358/86, 181; 455/3, 455/4, 5; 380/20, 23, 5, 10

[56] References Cited

U.S. PATENT DOCUMENTS

| | | | |
|---|---|---|---|
| 4,253,114 | 2/1981 | Tang et al. | 380/20 X |
| 4,367,557 | 1/1983 | Stern et al. | 455/4 |
| 4,381,522 | 4/1983 | Lambert | 455/4 X |
| 4,455,570 | 6/1984 | Saeri et al. | 455/4 X |
| 4,506,387 | 3/1985 | Walker | 358/86 X |
| 4,538,174 | 8/1985 | Gargini et al. | 358/86 X |
| 4,700,386 | 10/1987 | Kohn | 380/10 |
| 4,890,320 | 12/1989 | Monslow et al. | 358/86 X |
| 4,947,244 | 8/1990 | Fenwick | 380/5 |

Primary Examiner—James J. Groody
Assistant Examiner—Mark R. Powell
Attorney, Agent, or Firm—J. Stephen Yeo

[57] ABSTRACT

System for distributing video programs includes a transmission system having a plurality of channels, includes a stored database representing a predetermined schedule including timing instructions. A computer is programmed to provide real time outputs in response to the database time instructions. A bus has an input coupled to the computer and providing control signals in response to the real time outputs. A recorded media contains programs in television format. A plurality of video players are used for playing the recorded media, each video player having a control port coupled to the bus and responsive to the control signals. Each video player has an output providing television signals for coupling to a separate corresponding channel, and at least two of the video players loaded with duplicate recorded media and controlled to play at staggered overlapping time intervals. A character generator is coupled to the computer for providing to a channel a menu in television format representing a programming schedule. Scrambling means are interposed between the output of a video player and the corresponding channel for scrambling the television signal. Access means provides downstream access to a channel and unscrambles a television signal on an accessed channel. The access means provides access to the first and second channels thereby allowing return to the same point of a program after a pause equal to the staggered time interval.

5 Claims, 2 Drawing Sheets

VIDEO DISTRIBUTION SYSTEM ALLOWING VIEWER ACCESS TO TIME STAGGERED INDENTICAL PRERECORDED PROGRAMS

CORRESPONDING COPENDING APPLICATIONS

The following applications are relevant to this application.

U.S. patent application Ser. No. 07/633,640, filed Dec. 21, 1990 for apparatus for distributing video programs; U.S. patent application Ser. No. 07/633,641, filed Dec. 21, 1990 for system for transferring television programs.

BACKGROUND OF THE INVENTION

This invention is concerned with video telecommunication systems, and more particularly is concerned with a system for distributing video programming.

Pay-Per-View (PPV) networks can transmit on satellite broadcast, or local distribution systems. Pay-Per-View (PPV) networks generally provide only one channel of programming, with some PPV networks providing multiple channels.

It is desirable to provide a PPV system which has the capacity to distribute a plurality of programs using commercially available equipment and any transmission system having at least a corresponding number of channels.

SUMMARY OF THE INVENTION

Briefly, there is provided a system for distributing video programs over a transmission medium having a plurality of channels. A stored database represents a predetermined schedule including timing instructions. A computer is programmed to provide real time outputs in response to the timing instructions. A bus has an input coupled to the computer and provides video player control signals in response to the real time outputs. A recorded media contains programs. A plurality of video players are used for playing the recorded media, each video player having a control port coupled to the bus and responsive to the control signals. Each video player has an output to provide video signals coupled to a separate corresponding channel. Scrambling means are interposed between the output of a video player and the corresponding channel for scrambling the television signal. Access means enables downstream access to a channel and unscrambles a video signal on an accessed channel. Access means provides downstream access to a channel and unscrambles a television signal on an accessed channel. The access means provides access to the first and second channels thereby allowing return to the same point of a program after a pause equal to the staggered time interval.

DETAILED DESCRIPTION OF THE INVENTION

Figure 1:
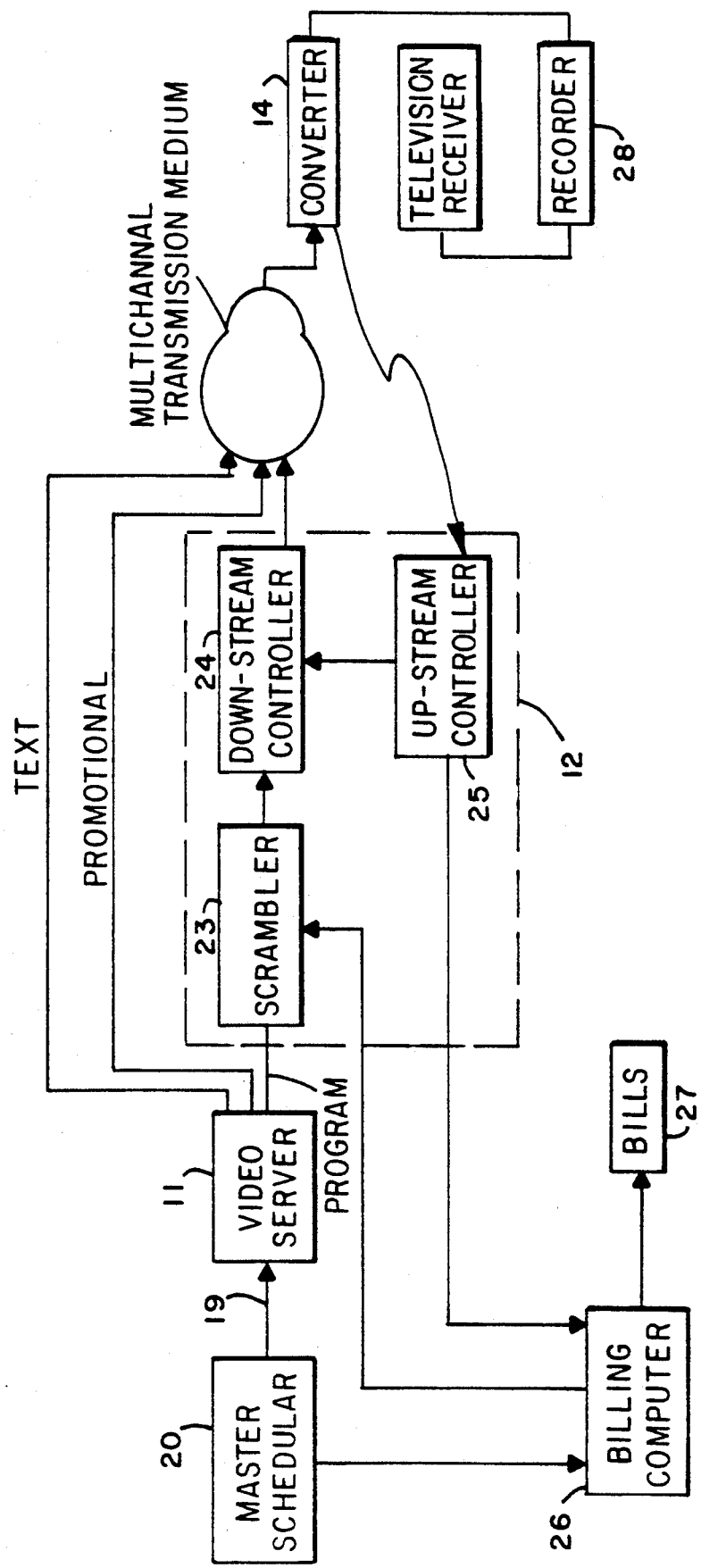
FIG. 1 is a schematic representation of a system for distributing video programming, including a video server.

Referring first to FIG. 1, there is seen a schematic representation of a system 10 for distributing video programming. System 10 includes a video server 11 interfaced to the headend 12 of a transmission system 13 having a plurality of channels, and a downstream converter 14.

Figure 2:
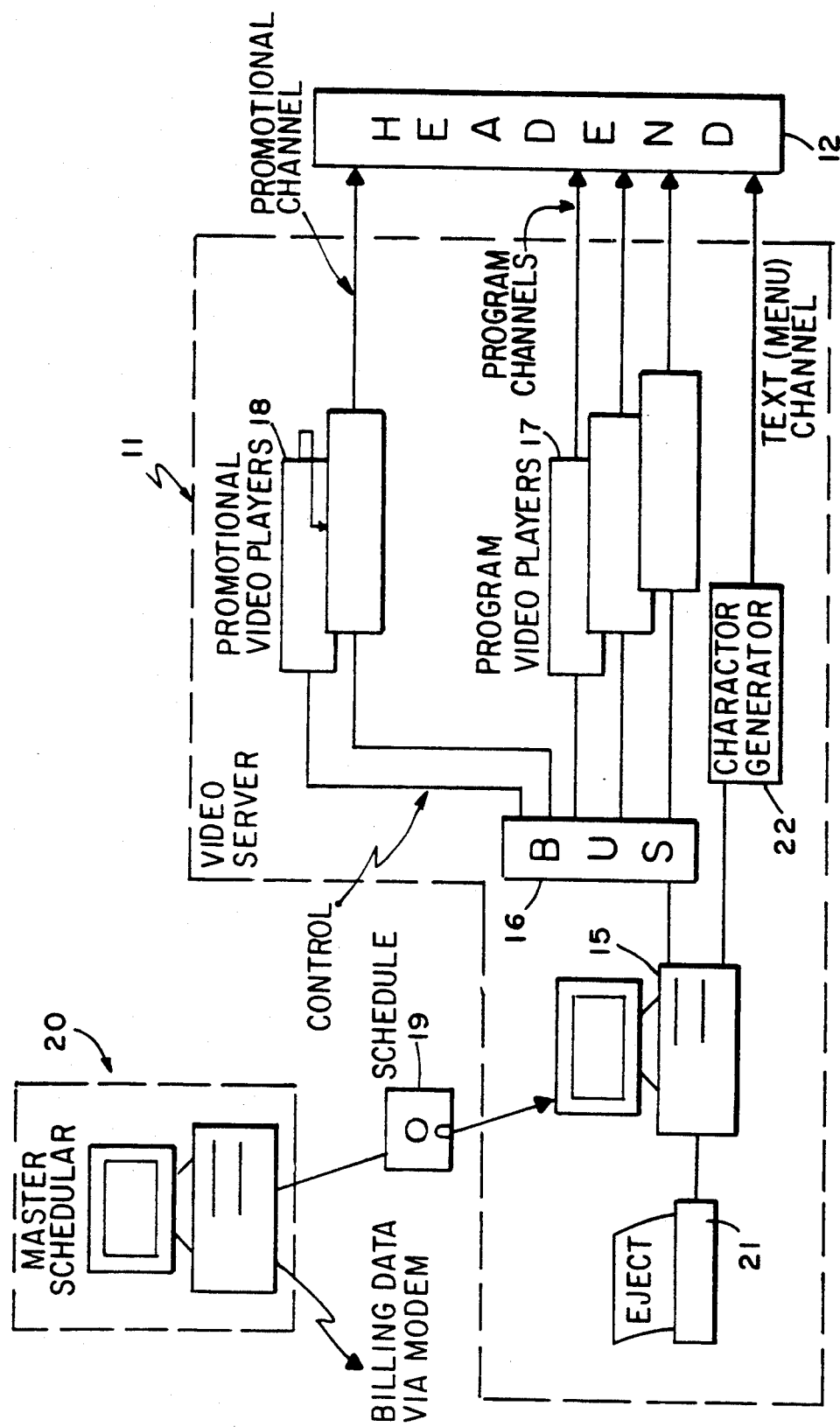
FIG. 2 is a block diagram of a video server.

FIG. 2 is a block diagram of the video server 11, which includes, among other elements, a serving computer 15 and software, a control bus 16 and a plurality of video players 17.

The serving computer 15 performs all scheduling and control functions (e.g. start, stop, rewind, etc.) for the video players 17 and gathers video player usage data. The serving computer 15 is loaded with a scheduling database representing a predetermined schedule data including timing instructions. The serving computer 15 is programmed to provide real time outputs in response to these timing instructions. The scheduling database may be provided to the serving computer 15 on magnetic memory 19 or transferred directly from a scheduling computer 20. The program schedule database includes a five-digit event code (for each program showing), title, rating, channel, starting times, dates, run time, and price.

The serving computer 15 also monitors the status of the video players 17, and operates promotional channel video players 18. Operations are controlled through a menu. A printer 21 prints a hardcopy listing the program to be placed in each video player 17. An operator display provides video player status monitoring. A status screen indicates whether a video playback machine is playing, rewinding, waiting to start playing, not in use, setting-up, or has failed. Provision of an alarm during video player failure is included. Monitors (not shown) show what is on a selected channel.

Commercial parallel bus 16 provides a communications path between an output port of serving computer 15 and video players 17 and 18, allowing the serving computer 15 to automatically operate the control features of the video players. Bus 16 includes one or more bus controller panels which provide control signals in response to the real time outputs of the computer 15. These in turn operate video player parallel decoders, each of which can control several video players.

Video players 17 are used for playing recorded media containing programs in television format or for coupling a line feed from a live program. The video players 17 may be any controllable player means such as video cassette recorders (VCRs) or disk players. Pre-recorded video cassette format is the most abundant medium for video storage. Video cassette players may be software controlled for automatic rewind and playback of tapes. Optical disks are another storage medium. An attractive feature of optical disk players is the capability of multiple playing heads reading a disk.

Each video player has a control port coupled to the bus 16 and is responsive to the control signals. Each video player also has an output providing television signals for coupling to a separate corresponding channel via the headend of the transmission system.

The video players 17 play video selections starting at pre-selected times. Each player can be set for different start times. At the start time, the medium is played at the start of the active program, which is not necessarily the beginning of the medium. At the end of the program the medium is automatically rewound, if necessary, and set to the program start.

At least two of the video players 17 loaded with duplicate recorded media and controlled to play at staggered overlapping time intervals.

The medium is changed in the video server upon one of two circumstances. The first is that the schedule dictates that a different program will start at a certain time and on a certain channel and the existing video medium should be removed and a new medium inserted. The second circumstance occurs if the medium degrades with usage and has been played a specified number of times. It is then replaced with a fresh copy.

During a pause such as rewinding, the input from another source cuts through the video player and becomes the player output which is shown on the channel. This enables the viewer's channel to show another video source such as a promotional or text channel during times when the player is not showing a program. Arrangements for a promotional channel are described below.

The video players 17 have stereo audio capacity. Since it is desirable to operate audio through balanced pairs for common mode rejection, two audio outputs are connected to a pair of unbalance-to-balance buffer amplifiers. Each video player's output signal is coupled to a corresponding channel at headend 12.

Each video player output is coupled to a corresponding channel on the transmission system. The video output of the video server is connected through scrambling means in the headend 12. Each signal is scrambled at the headend before being placed on the transmission system.

Video server 11 provides a promotional channel. The promotional channel operates similar to a program, except each promotional segment is shorter in length than a program and is played continuously on one of two promotional video players 18 and it is not scrambled. The two players alternately playing identical preview segments. As one is playing, the other is rewinding. The promotional channel appears to play continuously. The switch from one video player to the other is set at a regular interval which does not interfere with controller operations of the other channels.

The promotional channel continuously shows promotional programming such as program previews, event promotions, order instructions, and programming information. A short promotional segment may be repeated back-to-back on a recorded medium so that the medium does not have to be rewound as frequently thereby reducing wear. Information on the promotional channel is changed as required, e.g. monthly, according to programming schedule. The promotional channel operations are software controlled by the serving computer 15.

A character generator 22 is coupled to the serving computer 15 for providing a menu in television format representing a programming schedule. Server computer 15 continuously synchronizes the menu information with the video servers. The output of the character generator 22 is coupled unscrambled though headend 12 to a channel designated for text.

The output of the character generator 22 is also connected into the input of the first promotional video player. The output of the first promotional video player is connected into the input of the second promotional video player. The output of the second promotional video player is connected to a channel designated for promotionals. If both promotional video players 18 are in a non-play condition, then the character generator 22 output is automatically connected into the promotional channel.

Amplification of the promotional channel output signal is provided if the promotional channel output signal is also fed to the plurality of program video players 17. A distribution amplifier is used to distribute the promotional channel to the video input of each program video player if such a feature is desired.

Perusing FIG. 1, the programs and promotions are distributed on separate channels of the transmission system 13. Such a transmission system may be broadcast, satellite, cable, or fiber. Headend 12, includes a scrambler 23 which scrambles the program channels.

Converter 14, i.e. access means, enables downstream access to a channel. The appropriate channel must be unscrambled for a subscriber at the start of the program.

The preferred ordering system is impulse pay-per-view. Converter 14 is enabled by the customer to access, i.e. descramble, the television signal on an accessed channel. Converter 14 may also be enabled to descramble two channels carrying the same program at a staggered interval, thereby allowing return to the same point of a program after a pause equal to the staggered time interval. For example, the subscriber orders a program beginning at 8:00 p.m. The appropriate channel is unscrambled as well as the channel having the same program to the next starting time of 8:15 p.m. so that the viewer may return to the same point in a program after a break.

Sometime after the end of the program the channel is again scrambled. The run time of the program can be used to indicate the time to scramble a channel, although it is preferred to leave the channel unscrambled up until the start of the next program because promotional channel information is shown at the end of the program. The channel is then again scrambled to prevent the customer to see the next showing on the channel.

The ordering process allows ordering from a choice of different programs which start at various times. The ordering process is capable of processing orders, both ordering and cancelling service, in advance or up until some time into the event.

The ordering system also allows authorization prior to service delivery. Two types of authorization may be provided for authorization based on credit limitation or parental control. Accurate records, correlated by program, are kept by the converter until transferred for analysis. Records include data on customer, events ordered and cancelled (program title, start day and time), time and day of order transaction, blockage in ordering or receiving service, and price of program.

Preferably, a downstream controller 24 located in the headend 12, daily polls each set-top converter 14 which has collected billing data and requests it to call a preassigned number to access via the public switched telephone network to upstream controller 25, also located at the headend 12, and up-load its billing data to upstream controller 25. Upstream controller 25 then stores and formats the billing data from converter 14 and periodically transfers this data to a billing computer 26. Billing computer 26 receives information for each transaction on the customer, the event code ordered, and any other necessary data. Billing computer 26 already has program schedule data to identify event code with title, rating, channel, starting times as well as date, run time, and price. Billing computer 26 prints a bill 27 which includes the program title, date, time and price.

The system is adapted for transferring television programs from the video server 11, i.e. a transmitter, over the transmission system 13 to a downstream video recorder 28 coupled to the converter 14. Downstream recorder 28 records the program in response to control signals from the downstream controller 23 of video server 11. The downstream control signals may be sent on cable, fiber, or telephone lines, but preferably the same media the television signals are sent on.

The preferred embodiment of the invention has been described. Variations and modifications of the invention will now be apparent to those skilled in the art in light of these teachings. Accordingly, the scope of the invention is to be determined by the following claims and not by the details of the foregoing description.

What is claimed is:

1. A system for distributing video programs over a plurality of channels comprising:
   a transmission system having a plurality of channels;
   a stored database storing a predetermined schedule including timing instructions;
   a computer programmed to provide real time outputs in response to said database time instructions;
   a bus having an input coupled to said computer and conveying control signals in response to said real time outputs;
   recorded media containing programs in television format;
   a plurality of video players for playing said recorded media, each video player having a control port coupled to said bus and responsive to said control signals, each video player having an output providing television signals coupled to a separate corresponding channel, at least two of said video players loaded with duplicate recorded media and controlled to play at staggered overlapping time intervals on first and second channels; and
   access means for providing downstream access to a channel, wherein said access means provides access to said first and second channels thereby allowing return to the same point of a program after a pause equal to said staggered time interval.

2. The system of claim 1 further comprising a character generator coupled to said computer and having an output coupled to a channel for providing a menu in television format representing a programming schedule.

3. The system of claim 2 further comprising at least one promotional video player for playing promotional programming, said promotional video player having an output coupled to a promotional channel.

4. The system of claim 3 further comprising a character generator coupled to said computer and having an output coupled to a channel for providing a menu in television format representing a programming schedule and coupled into the input of the promotional video player, arranged so that if said one or more promotional video players are in a non-play condition, then the character generator output is automatically connected into the promotional channel.

5. The system of claim 1 further comprising scrambling means interposed between an output of a video player and said corresponding channel for scrambling said television signal, and wherein said access means unscrambles a television signal on an accessed channel in accordance with an enabling signal.

* * * * *